United States Patent [19]

Yamaguchi

[11] Patent Number: 5,365,047
[45] Date of Patent: Nov. 15, 1994

[54] IC CARD WITH CLOCK SIGNAL INPUT CONTROL

[75] Inventor: Atsuo Yamaguchi, Itami, Japan

[73] Assignee: Mitsubishi Denki Kabushiki Kaisha, Tokyo, Japan

[21] Appl. No.: 43,788

[22] Filed: Apr. 6, 1993

[30] Foreign Application Priority Data

Apr. 7, 1992 [JP] Japan .................................. 4-085699
Feb. 1, 1993 [JP] Japan .................................. 5-014651

[51] Int. Cl.⁵ ............................................. G06K 19/073
[52] U.S. Cl. ..................................... 235/380; 235/492
[58] Field of Search ................. 235/380, 487, 492, 379

[56] References Cited

U.S. PATENT DOCUMENTS

| | | | |
|---|---|---|---|
| 4,556,958 | 12/1985 | Ugon | 364/200 |
| 4,692,601 | 9/1987 | Nakano | 235/380 |
| 4,803,351 | 2/1989 | Shigenaga | 235/492 |
| 4,814,591 | 3/1989 | Nara et al. | 235/380 |
| 4,845,351 | 7/1989 | Hara et al. | 235/487 X |
| 5,105,074 | 4/1992 | Nara | 235/492 |
| 5,157,247 | 10/1992 | Takahira | 235/492 |
| 5,168,151 | 12/1992 | Nara | 235/492 |
| 5,182,442 | 1/1993 | Takahira | 235/492 |
| 5,212,373 | 5/1993 | Fujioka et al. | 235/492 |

FOREIGN PATENT DOCUMENTS 0446519 9/1991 European Pat. Off. .
2663764 12/1991 France .
2245725 1/1992 United Kingdom .

OTHER PUBLICATIONS

Mitsubishi Electric Data Sheet for microcomputer chip M38002M4–XXXSP/FP.

Primary Examiner—John Shepperd
Attorney, Agent, or Firm—Leydig, Voit & Mayer

[57] ABSTRACT

The invention provides an IC card which performs control of allowing or inhibiting input of a clock signal externally of the card via no CPU. In the present IC card, those ones of a CPU 1a, a UART 7a, a timer 3 and an EEPROM 5a which require the clock signal for operation generate operation signals. In accordance with these operation signals, a clock control circuit 8 performs control of allowing or inhibiting input of the clock signal externally of the card without intervention of the CPU 1a. Supply of the clock signal to the CPU 1a is stopped upon an STP command executed by the CPU 1a, and resumed in accordance with any of start-up select conditions set by the CPU 1a and corresponding one of operation end signals from the UART 7a, the timer 3 and the EEPROM 5a.

4 Claims, 6 Drawing Sheets

IC CARD WITH CLOCK SIGNAL INPUT CONTROL

BACKGROUND OF THE INVENTION

FIELD OF THE INVENTION

The present invention relates to an IC card, and more particularly to a standby function of the IC card.

DESCRIPTION OF THE RELATED ART

When IC cards are used with battery-driven portable equipment such as portable telephones, a reduction in electric power consumed by the IC cards is required for prolonging a service life of batteries. To this end, there are utilized CMOS techniques in relation to the semiconductor manufacture technology, a standby function of stopping supply of a clock signal to a CPU during the blank time in the course of CPU processing to thereby cease the operation, and so on.

IC cards have been conventionally employed in the form of credit cards, bank cards, clinic cards, member cards, ID cards, etc. In these application fields, cards are inserted to readers/writers for processing only when required, and normally carried by card possessors. Meanwhile, IC cards have recently become more commonly used with battery-driven portable equipment such as portable telephones. In this case, once set into the portable equipment, the IC card is left there for use. In other words, as long as the portable equipment is kept energized, the IC card also continues being energized. Because of portable equipment, however, wasteful consumption of their batteries requires to be held down as small as possible. Accordingly, it is desired that IC cards are maintained in a standby state in which electric power is less consumed, and start operation upon receiving an input signal.

Figure 7:
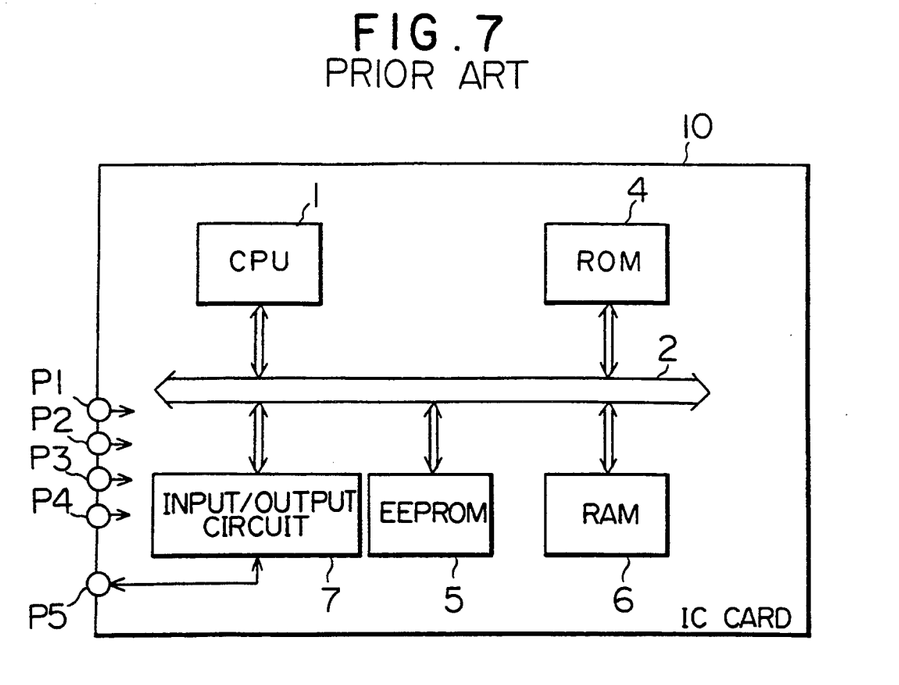
FIG. 7 is a block diagram showing the internal configuration of a conventional IC card.

A description will be first given of prior art having no standby state. FIG. 7 is a block diagram schematically showing the internal configuration of a conventional IC card with no standby function. In FIG. 7, an IC card 10 comprises a CPU (Central Processing Unit) 1 for executing arithmetic operations and control steps necessary for data processing, i.e., for carrying out execution and control of various programs required for data processing, a ROM 4 as a program memory for storing the programs required for data processing, etc., i.e., for storing programs to execute various functions which are actually used by card users, a writable nonvolatile EEPROM (Electrically Erasable Programmable ROM) 5 as a personal information memory for storing personal information of a card user and so on, a RAM 6 as a temporary storage memory for temporarily storing data necessary for data processing, an input/output circuit 7 serving to input and output data from and to an external unit (not shown), and a system bus 2 for connecting the above components to one another.

Further, denoted by P1 is a positive source power input terminal, P2 is a negative source power input terminal, P3 is a reset terminal through which a reset signal for initializing the CPU 1 is input, P4 is a clock terminal through which a clock signal is input, and P5 is an I/O terminal through which data is input and output. Connected to the I/O terminal P5 is the input/output terminal 7 which is in turn connected to the system bus 2. The input/output circuit 7 serves to input and output data between the IC card 10 and the external unit via the I/O terminal P5.

Figure 8:
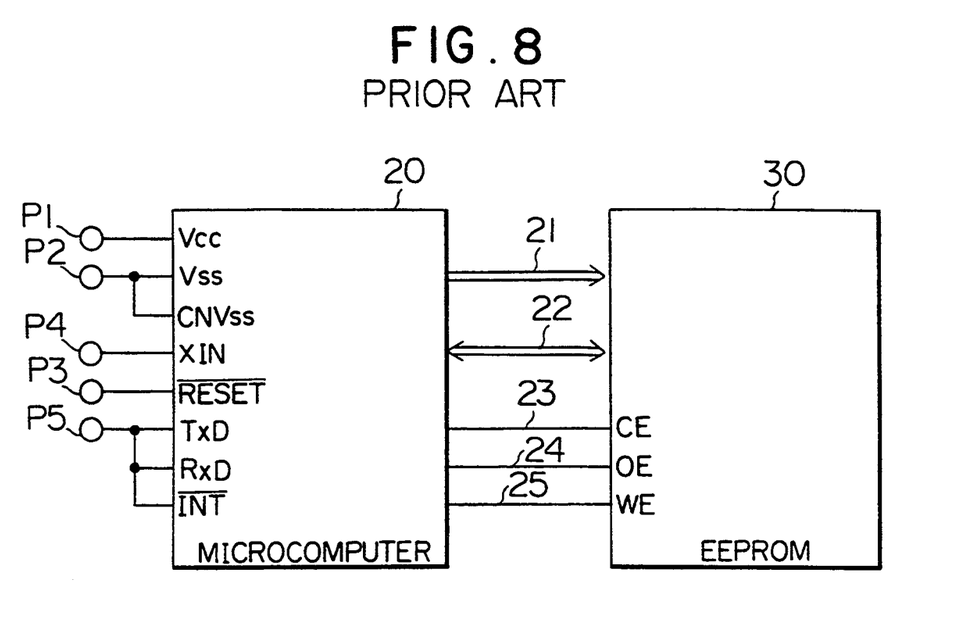
FIG. 8 is a diagram showing the internal configuration of an IC card having a standby function.

FIG. 8 shows an example of the circuit configuration of principal parts of an IC card using an 8-bit microcomputer M38002 which has a standby function. In FIG. 8, denoted by 20 is a microcomputer comprising M38002 and 30 is an EEPROM comprising M5M28C64A. The EEPROM 30 is connected to the microcomputer 20 and operated entirely under control of the microcomputer 20. The microcomputer 20 includes functions corresponding to the CPU 1, the ROM 4, the RAM 6 and the input/output circuit 7 in FIG. 7. Also, terminals P1 to P5 correspond to the terminal P1 to P5, respectively.

A positive source power terminal (Vcc) of the microcomputer 20 is connected to the positive source power input terminal P1, while a negative source power terminal (Vss) and a mode setting input terminal (CNVss) are both connected to the negative source power input terminal P2. A clock input terminal (XIN) is connected to the clock terminal P4 and a reset terminal (RESET) is connected to the reset terminal P3. The microcomputer 20 includes, as the input/output circuit 7, a UART (Universal Asynchronous Receiver/Transmitter) (not shown separately) of which input terminal (RxD) and output terminal (TxD) are both connected to the I/O terminal P5. An interrupt input terminal (INT) is also connected to the I/O terminal P5. Between the microcomputer 20 and the EEPROM 30, there are connected an address bus 21, a data bus 22, a chip enable signal line 23, an output enable signal line 24 and a write enable signal line 25.

The circuit of FIG. 8 is operated to provide a standby function as follows. When a CPU (not shown separately) in the microcomputer 20 has completed the processes to be executed by itself, it stops operation by executing a stop command (STP command) or a wait command (WIT command) stored in the ROM. Specifically, the CPU inhibits a clock signal from being applied through the clock input terminal (XIN), and executes the STP command when operation of all the card parts should be stopped, or the WIT command when operation of only the CPU should be inhibited.

When operation of all the card parts is stopped upon the STP command, the CPU is started up by applying a start-up command via the interrupt input terminal (INT) connected to the I/O terminal P5, so that all the functions restore to operable states. On the other hand, when only the CPU is stopped upon the WIT command, the UART as the input/output circuit continues operating and, at the time transmission or reception of data in the UART has come to the end, the CPU is started up for proceeding to the next operation. Power consumption is of course smaller in the stop state upon the STP command than in the stop state upon the WIT command.

With the conventional IC card having a standby function arranged as mentioned above, the determination whether to inhibit input of the clock signal externally of the card upon the STP command, or stop the clock signal only for operating the CPU upon the WIT signal is made by the CPU in accordance with the program. This has raised the problems that the program is so complicated as to need a lot of labor and time for programming, and the burden exposed on the CPU is increased.

SUMMARY OF THE INVENTION

The present invention has been accomplished with a view of solving the problems as set forth above, and its object is to provide an IC card having a standby function in which the determination as to whether a clock signal is inhibited from being input externally of the card or not is made via no CPU, thereby relieving the burden required for programming and enabling a further saving in power consumption.

To achieve the above object, the present invention is intended for an IC card comprising data input/output means started up upon detection of a start bit added to the head of data for performing data input/output control between said card and the exterior; data processing means for performing data processing; nonvolatile memory means for storing programs to be executed by said data processing means; writable nonvolatile memory means for storing various data; clock control means for performing input control of a clock signal externally of said card; timer means for counting a set time; and system bus means for interconnecting said respective means, wherein those ones of said data input/output means, said writable nonvolatile memory means, and said timer means which require said external clock signal for operation generate operation signals indicating that the corresponding means are under operation and need said clock signal; and said clock control means includes a switching control section for performing control of allowing or inhibiting supply of said clock signal to said data processing means in accordance with operating states of said respective means, and a clock input control section operating in accordance with a state of said switching control section and states of said operation signals such that when any one or more means are under operation and need said clock signal, said clock signal is allowed to be input and supplied to those means, the supply of said clock signal to said data processing means being controlled via said switching control section, and when all said means are in states of not needing said clock signal, input of said clock signal is inhibited, thereby controlling supply of said clock signal to said respective means.

In the IC card of the present invention, the clock control means functions in such a manner as to allow input of the clock signal externally of the card if any of means requiring the external clock signal for operation is under operation, to allow the clock signal to be continuously input even after the data processing means has stopped operation if any of means is still in a state of needing the clock signal, and to inhibit input of the clock signal without intervention of the data processing means when all the means are in states of not requiring the clock signal. Further, when data is input from the exterior in a standby state of the IC card, the data output means detects the input data and sends to the clock control means an operation signal indicating that the clock signal is needed, whereupon the clock control means allows input of the clock signal. Accordingly, input of the clock signal is allowed without intervention of the data processing means. Thus, the data processing means, i.e., a CPU, is only required to be always stopped upon an STP command and input control of the clock signal is performed by the clock control means.

BRIEF DESCRIPTION OF THE INVENTION

DETAILED DESCRIPTION OF PREFERRED EMBODIMENTS

Hereinafter, preferred embodiments of the present invention will be described with reference to the accompanying drawings.

Figure 1:
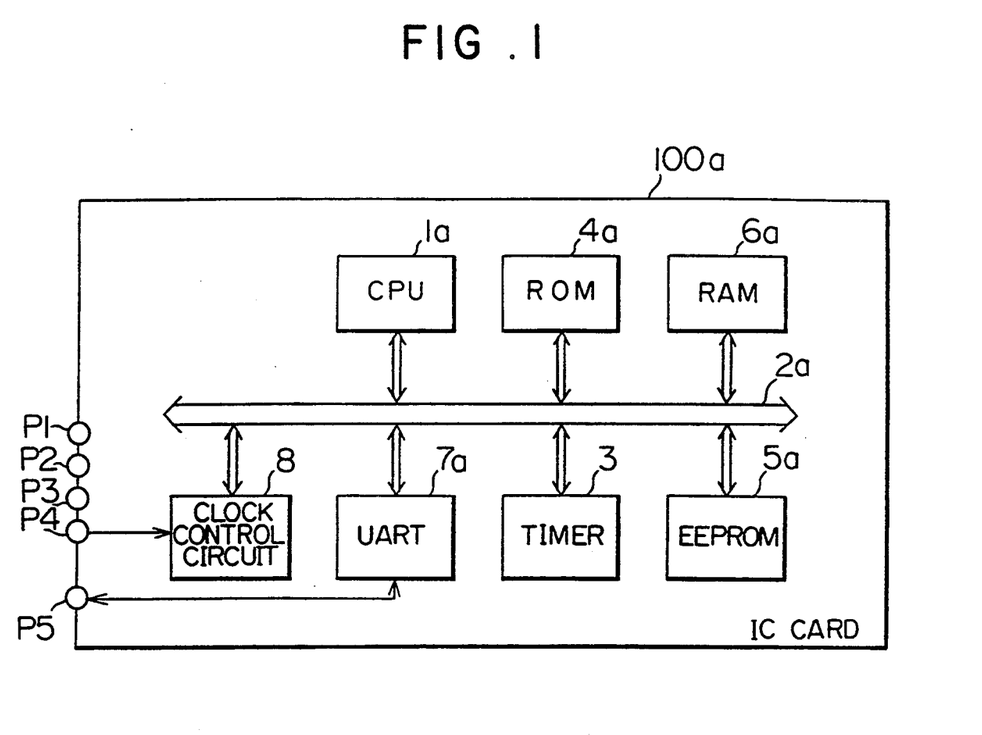
FIG. 1 is a block diagram showing the internal configuration of an IC card according to one embodiment of the present invention.

FIG. 1 is a block diagram showing the internal configuration of an IC card with a standby function according to one embodiment of the present invention. An IC card 100a shown in FIG. 1 is of the same basic configuration as the conventional IC card with a standby function shown in FIG. 8, but FIG. 1 illustrates the IC card 100a in the form of functionally separated blocks. Specifically, denoted by 1a is a CPU for executing data processing, etc., 2a is a system bus, 3 is a timer, 4a is a ROM storing programs necessary for data processing, etc., 5a is a writable nonvolatile EEPROM, 6a is a RAM as a temporary storage memory, and 7a is a UART as an input/output circuit.

The present IC card is different from the conventional one in the following points. First, there is provided a clock control circuit 8 connected to the clock terminal P4 for controlling input of a clock signal externally of the card, thereby achieving the standby function. Next, the UART 7a, the timer 3 and the EEPROM 5a supply, to the clock control circuit 8, operation signals (see a UART signal, a TIMER signal and an EEPROM signal in FIG. 4) each indicating that the corresponding circuit is under operation and needs the clock signal.

Figure 4:
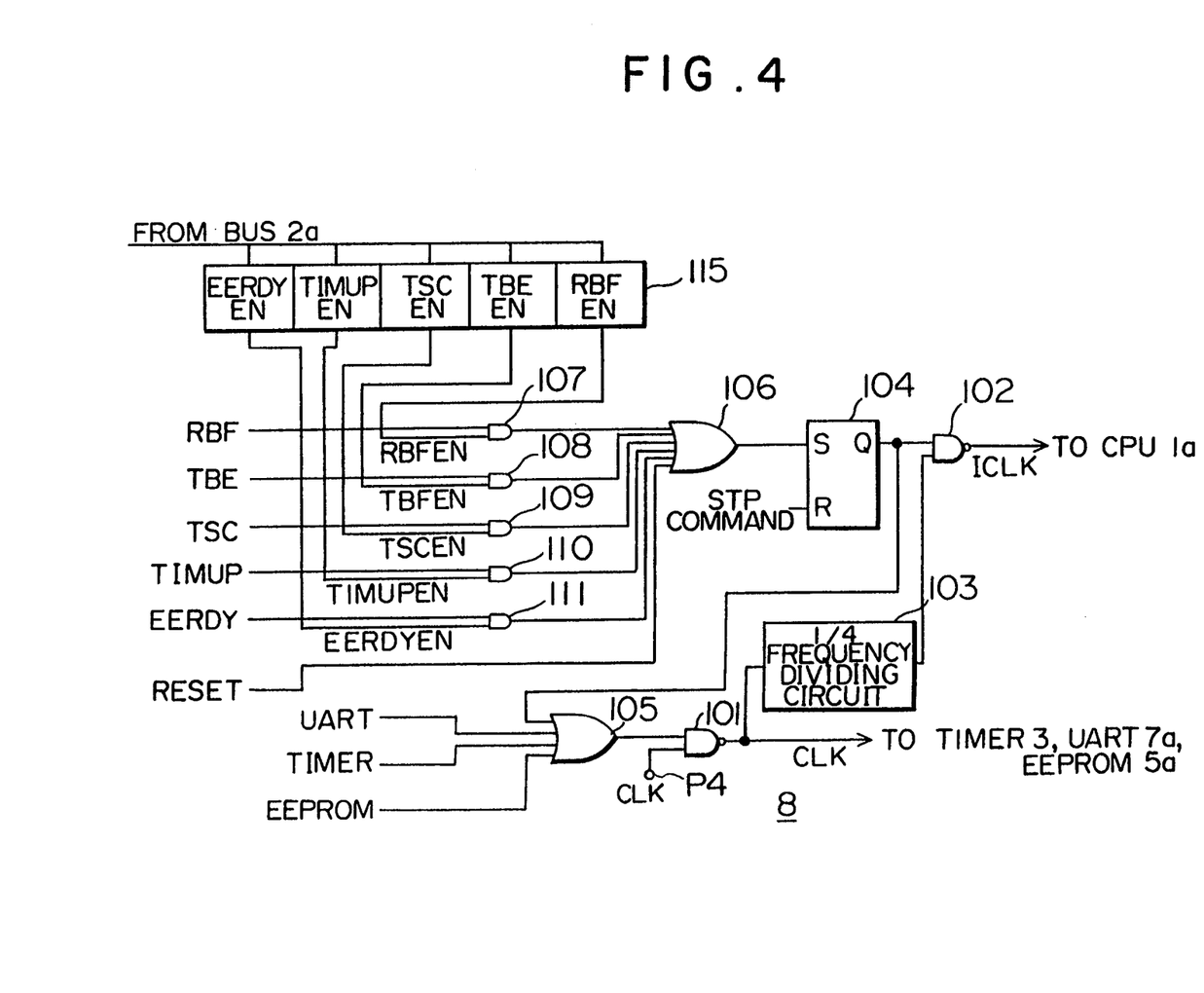
FIG. 4 is a circuit diagram of a clock control circuit in FIG. 1.

Also, the UART 7a, the timer 3 and the EEPROM 5a separately supply, to the clock control circuit 8, operation end signals (see an RBF signal, a TBE signal, a TSC signal, a TIMUP signal and an EERDY signal in FIG. 4) each indicating that a corresponding predetermined operation has been completed. The clock control circuit 8 controls input of the clock signal externally of the card in accordance with the operation signals and a signal indicating whether the CPU 1a needs an internal clock signal or not, and controls supply of the internal clock signal to the CPU 1a in accordance with the operation end signals and later-described start-up select conditions set by the CPU 1a.

Furthermore, while the ROM 4a stores the programs for carrying out various functions to be executed by the CPU 1a, the IC card of the present invention determines in the clock control signal 8 as to whether to inhibit input of the clock signal externally of the card or stop only the internal clock signal necessary for operation of the CPU 1a and, therefore, the programs stored in the ROM 4a include no programming related to such a determination process.

Additionally, the UART 7a constitutes data input/output means, the CPU 1a data processing means, the ROM 4a nonvolatile memory means for storing programs, the EEPROM 5a writable nonvolatile memory means for storing various data, the clock control circuit 8 clock control means, the timer 3 timer means, and the system bus 2a system bus means, respectively.

Figure 2:
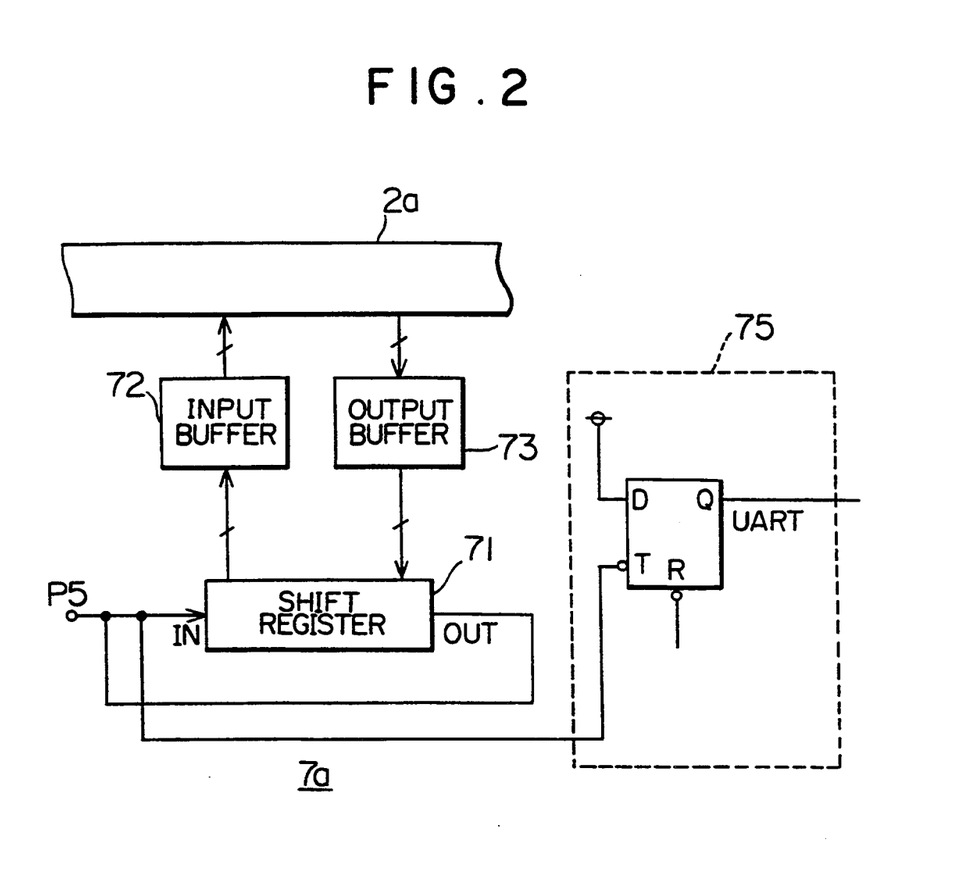
FIG. 2 is a block diagram schematically showing the internal configuration of a UART in FIG. 1.
Figure 3:
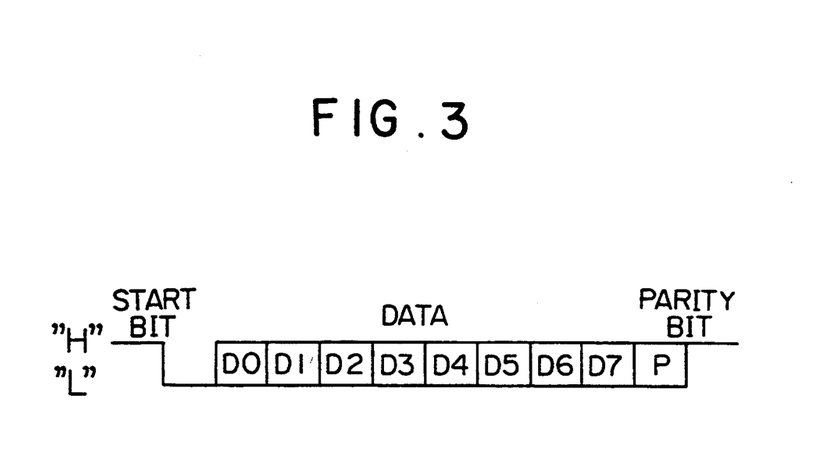
FIG. 3 is a diagram showing the bit configuration of data.

FIG. 2 is a block diagram schematically showing the internal configuration of the UART 7a in FIG. 1. The UART 7a performs input/output control of data which is input and output via the I/O terminal P5. Denoted by 71 is a shift register for converting a serial signal input through the I/O terminal P5 into a parallel signal which is supplied to the system bus 2a, and for converting a parallel signal from the system bus 2a into a serial signal which is supplied to the I/O terminal P5. 72 and 73 are an input buffer and an output buffer inserted between the shift register 71 and the system bus 2a, respectively. 75 is an input data detecting circuit formed of a flip-flop which generates the UART signal upon a start bit at the head of data being applied to the I/O terminal P5. The UART signal is supplied to the clock control circuit 8 for indicating that the UART 7a needs the external clock signal for its operation. As shown in FIG. 3, external data being of 8 bits usually comprises a start bit (1 bit) of "L" level, subsequent data (8 bits), and a further subsequent parity bit (1 bit). Using such external data, the start bit is detected by the input data detecting circuit 75, whereupon the UART 7a is started up.

FIG. 4 shows a circuit diagram of the clock control circuit 8 in FIG. 1. The external clock signal applied through the clock terminal P4 is connected to one input terminal of a NAND gate 101, and a clock signal CLK output from the NAND gate 101 is supplied to the timer 3, the UART 7a, the EEPROM 5a and a ¼ frequency dividing circuit 103. The ¼ frequency dividing circuit 103 divides the frequency of the clock signal supplied to the same into ¼, and a resulting signal is supplied to one input terminal of a NAND gate 102.

An output signal of the flip-flop 104 is supplied to the other input terminal of the NAND gate 102. The flip-flop 104 determines whether to stop the CPU 1a or not, i.e., whether to inhibit or allow supply of the internal clock signal to the CPU 1a. When the output signal of the flip-flop 104 is at an "H" level, the NAND gate 102 supplies the clock signal having the frequency divided into ¼, as an internal clock signal ICLK, to the CPU 1a. When the output signal of the flip-flop 104 is at an "L" level, an output terminal of the NAND gate 102 is held at an "H" level to keep the internal clock signal ICLK in a stopped state. The flip-flop 104 is reset upon an STP command (or an STP signal) executed by the CPU 1a itself, and set upon an output signal of "H" level from an OR gate 106.

Connected to the OR gate 106 are output signals of AND gates 107 to 111 and a RESET signal (i.e., a reset signal) for forcibly starting up the CPU 1a. Applied to one input terminals of the AND gates 107, 108 and 109 are from the UART 7a, respectively, the RBF signal indicating that the UART 7a has received data and transferred the data to the input buffer 72, the TBE signal indicating that the output buffer 73 of the UART 7a is vacant and the CPU 1a can write transmitted data into the output buffer 73, and the TSC signal indicating that the UART 7a has completed transmission and the output buffer 73 and the shift register 71 have become vacant. Applied to one input terminal of the AND gate 110 is from the timer 3 the TIMUP signal indicating that the timer 3 has reached a set value. Finally, applied to one input terminal of the AND gate 111 is from the EEPROM 5a the EERDY signal indicating that write operation into the EEPROM 5a has completed. In response to any of the above signals, the CPU 1a is selectively started up.

A select register 115 is a register into which start-up select conditions are written from the CPU 1a and of which outputs indicating the respective start-up select conditions are applied, as an RBFEN signal, a TBEEN signal, a TSCEN signal, a TIMUPEN signal and an EERDYEN signal (collectively referred to as start-up select condition signals), to the other input terminals of the AND gates 107 to 111. Upon writing into the select register 115 from the CPU 1a, some required start-up condition is selected and the selected start-up select condition signal takes an "H" level. In the case, for example, where the CPU 1a has selected one such a start-up select condition as that the UART 7a has received data and transferred the data to the input buffer 72, the RBFEN signal is turned to an "H" level and, thereafter, when the RBF signal as the operation end signal is turned to an "H" level upon the UART 7a having received data and transferred the data to the input buffer 72, the output of the AND gate 107 takes an "H" level. Note that the select register 115 is not always included in the clock control circuit 8, and may be included in the CPU 1a for example, in some cases.

An OR gate 105 receives the operation signals from the UART 7a, the timer 3 and the EEPROM 5a, as well as the output of the flip-flop 104 as the operation signal for the CPU 1a. When any of the operation signals indicates that the corresponding circuit is under operation, the output signal of the OR gate 105 turns to an "H" level and is connected to the other input terminal of the NAND gate 101. When the output signal of the OR gate 105 is at an "H" level, the external clock signal is allowed to enter therethrough, followed by supplying the clock signal CLK to the timer 3, the UART 7a, the EEPROM 5a and the ¼ frequency dividing circuit 103. Further, when the CPU 1a is under operation and the output signal of the flip-flop 104 is at an "H" level, the internal clock signal ICKL, resulted from dividing the frequency of the external clock signal into ¼, is supplied to the CPU 1a. On the contrary, when all the above circuits are stopped in operation, the output signal of the OR gate 105 takes an "L" level so that input of the external clock signal is inhibited and no clock signals are supplied to any circuits.

Stated otherwise, when the CPU 1a is in a stopped state, the output signal of the OR gate 105 indicates that any of the UART 7a, the timer 3 and the EEPROM 5a is under operation and needs the clock signal externally of the card. In particular, when the I/O terminal P5 is shifted from an "H" level to an "L" level, the UART 7a is started up even in a state where no clock signals are applied to the UART 7a, thereby generating the UART signal which indicates that the UART 7a needs the clock signal. Accordingly, at the time of the I/O terminal 5 being shifted from an "H" level to an "L" level, supply of the clock signal to the UART 7a is resumed so that the UART 7a can properly receive the input signal.

It should be note that, in FIG. 4, 104, 106 to 111 and 115 jointly constitute a switching control section, and 101 to 103 and 105 jointly constitute a clock signal control section. Also, 104 and 106 to 111 jointly constitute a temporary storage section.

General operation of the CPU 1a in the present invention will be described below. In the present invention, the CPU 1a stops operation upon the STP command in all cases without using a WIT command. After executing the desired processing, the CPU 1a writes one or more required select conditions into the select register 115 and then comes into a stopped state by executing the STP command. Upon writing of the start-up select conditions, the corresponding output signals of the select register 115 are turned to an "H" level. Subsequently, when any of the UART 7a, the timer 3 and the EEPROM 5a comes into a state of permitting the CPU 1a, as a data processing section, to execute read/write operation for the associated circuit, the corresponding operation end signal which indicates the end of the just preceding operation is turned to an "H" level. This causes any output signal of the AND gates 107 to 111 to take an "H" level, whereupon the output signal of the flip-flop 104 becomes an "H" level. The internal clock signal is thereby supplied to the CPU 1a to start up the CPU 1a for executing the next process. The period from the stop of operation after writing the start-up select conditions to the subsequent start-up represents a blank time of the CPU 1a. Since the determination whether to inhibit input of the clock signal externally of the card or to inhibit input of the clock signal to the CPU 1a only is made by the clock control circuit 8, the CPU 1a is not required to make that determination and is always stopped upon the STP command as mentioned above.

Next, a description will be given of more specific operations.

1) When transmitting data of 2 bytes in succession

The CPU 1a sets the TBEEN signal to an "H" level by writing the corresponding start-up select condition into the select register 115. After that, the CPU 1a stops operation by executing the STP command. The CPU 1a is then kept stopped until the TBE signal turns to an "H" level. When there establishes a state of enabling data to be written into the output buffer 73 after the UART 7a has completed the just preceding operation, the TBE signal is turned to an "H" level. The output signal of the AND gate 108 is thereby turned an "H" level, causing the output of the flip-flop 104 to take an "H" level via the OR gate 106, whereupon the clock signal is supplied to the CPU 1a for starting up it. The CPU 1a then writes data into the output buffer 73 of the UART 7a. After writing the data, the CPU 1a stops operation by executing the STP command. Subsequently, the CPU 1a is kept stopped until the TBE signal turns to an "H" level again. When the TBE signal is turned to an "H" level, the CPU 1a writes the next data into the output buffer 73. After writing that data, the CPU 1a proceeds to the next process.

2) When receiving data externally of card in series of processing

The RBFEN signal and the TIMUPEN signal of the select register 115 is set to an "H" level by the CPU 1a. Also, the CPU 1a sets a predetermined time in the timer 3 and, simultaneously, allows the operation of the timer 3. After that, the CPU 1a stops operation by executing the STP command. The CPU 1a is then kept stopped until any of the RBF signal from the UART 7a and the TIMUP signal from the timer 3 turns to an "H" level. When the RBF signal is turned to an "H" level upon the data externally of the card being received, or when the TIMUP signal from the timer 3 is turned to an "H" level upon a time-out after the elapse of the predetermined time, the CPU 1a proceeds to the next process.

3) When writing data into EEPROM

The EERDYEN signal of the select register 115 is set to an "H" level by the CPU 1a. After instructing the EEPROM 5a to write data, the CPU 1a stops operation by executing the STP command. The EEPROM 5a performs a writing process and, at the completion of this process, the EERDY signal is turned to an "H" level. The CPU 1a is kept stopped until the EERDY signal turns to an "H" level and, thereafter, executes the next process.

4) When waiting the lapse of time

The TIMUPEN signal of the select register 115 is set to an "H" level by the CPU 1a. Then, after setting a predetermined time in the timer 3 and allowing it to start operation, the CPU 1a stops operation by executing the STP command. The timer 3 continues counting, and when the set time has elapsed, the TIMUP signal is turned to an "H" level. Upon the TIMUP signal turning to an "H" level, the CPU 1a is started up to execute the next process.

5) When transmitting data after completion of a series of processing, followed by coming into standby state The TBEEN signal of the select register 115 is set to an "H" level by the CPU 1a. Then, the CPU 1a stops operation by executing the STP command. The CPU 1a is kept stopped until the TBE signal from the UART 7a turns to an "H" level. When there establishes a state of enabling data to be written into the output buffer 73 of the UART 7a, the TBE signal is turned to an "H" level for starting up the CPU 1a. Then, the CPU 1a writes the data into the output buffer 73 of the UART 7a. After the writing, the CPU 1a sets the RBFEN signal of the select register 115 to an "H" level, followed by stopping operation by executing the STP command. When the data transmission is completed in the UART 7a and the operation of the UART 7a is stopped, input of the external clock signal is inhibited by the NAND gate 101, thereby bringing the CPU 1a into a standby state.

6) When started up from standby state

In the standby state where all the circuits are stopped and input of the external clock signal is inhibited, when a signal is input to the I/O terminal 5 for turning to an "L" level, the UART 7a is started up and the UART signal (operation signal) of "H" level, indicating that the UART 7a is under operation, is input to the OR gate 105. The external clock signal is thereby allowed to enter through the clock input terminal P4 for supply to the UART 7a, making the UART 7a enabled to receive data. After completely receiving the data, the RBF signal is turned to an "H" level. Since the RBFEN signal has been already turned to an "H" level as stated in the above case of 5), the output signal of the AND gate 107 takes an "H" level, whereupon the clock signal is supplied to the CPU 1a so that the CPU 1a is started up for executing the next process.

7) When noise enters I/O terminal in standby state

In the standby state where input of the external clock signal is inhibited, when noise enters the I/O terminal 5 for turning to an "L" level, the UART 7a is started up and the UART signal of "H" level, indicating that the UART 7a is under operation, is input to the OR gate 105. The external clock signal is thereby allowed to enter through the clock input terminal P4 for supply to the UART 7a, making the UART 7a enabled to receive data. Generally, however, the UART has a function of determining whether the received data is normal or not by detecting the start bit at the data head. Accordingly, in such a case of noise entering, since the start bit cannot be confirmed, the UART 7a stops operation and the UART signal turns to an "L" level. This brings the card again into the standby state where input of the external clock signal is inhibited.

The external data contains, as shown in FIG. 3, the start bit (1 bit) of "L" level at the head of its string. Therefore, whether the input signal is normal data or not can be determined by confirming the start bit. The confirmation of the start bit may be carried out as follows, for example. By confirming that the input signal remains at an "L" level after ½ bit subsequent to its shifting from an "H" level to an "L" level, the data is judged to be normal if so. On the other hand, if the input signal is at an "H" level after ½ bit, it is judged as noise.

8) When UART 7a is UART with byte resending function and parity error in received dada his found in standby state In this case, the UART 7a is of a UART with a byte resending function as disclosed in, for example, Japanese Patent Laid-Open No. 57-21145 (U.S.Pat. No. 4,556,958). In the standby state where all the circuits are stopped and input of the external clock signal is inhibited, when a signal is input to the I/O terminal 5 for turning to an "L" level, the UART 7a is started up and the UART signal, indicating that the UART 7a is under operation, is input to the OR gate 105. The external clock signal is thereby allowed to enter through the clock input terminal P4, making the UART 7a enabled to receive data. Then, the UART 7a starts operation of receiving the data. In the course of this operation, when a parity error is detected, the UART 7a transmits a resending request signal. After that, the UART 7a stops operation and the UART signal, indicating that the UART 7a is under operation, is turned to an "L" level, followed by coming into the standby state.

Meanwhile, some EEPROM's have internal clocks built therein and require no clock signals externally of cards. Therefore, a description will be given below of another embodiment in which the present invention is applied to an IC card having such an EEPROM.

Figure 5:
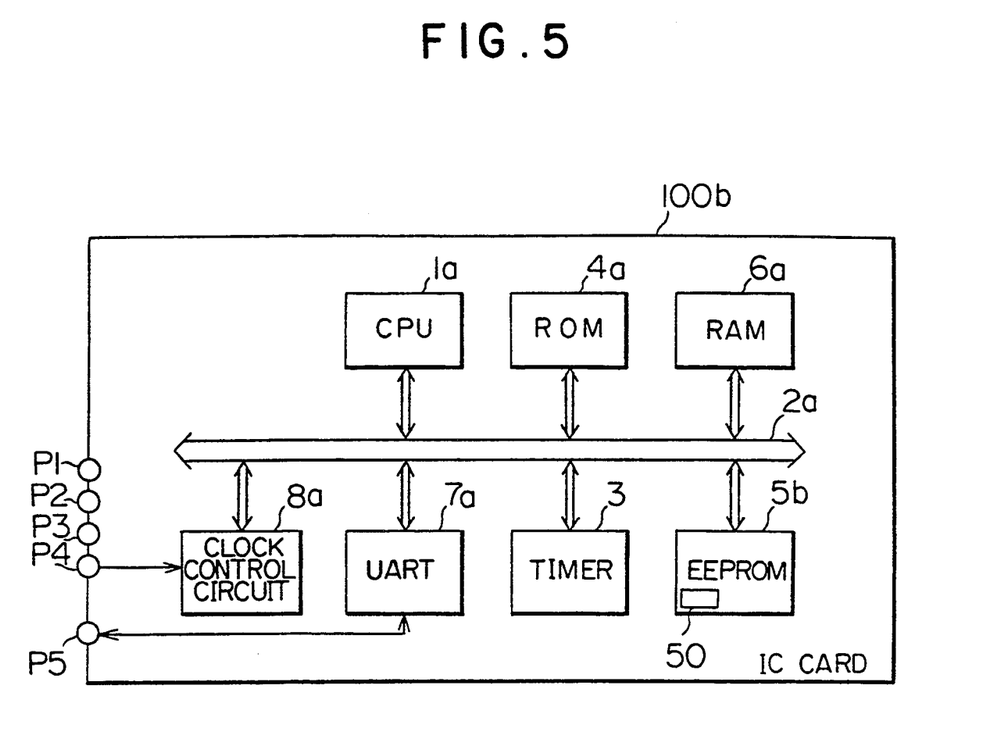
FIG. 5 is a block diagram showing the internal configuration of an IC card according to another embodiment of the present invention.
Figure 6:
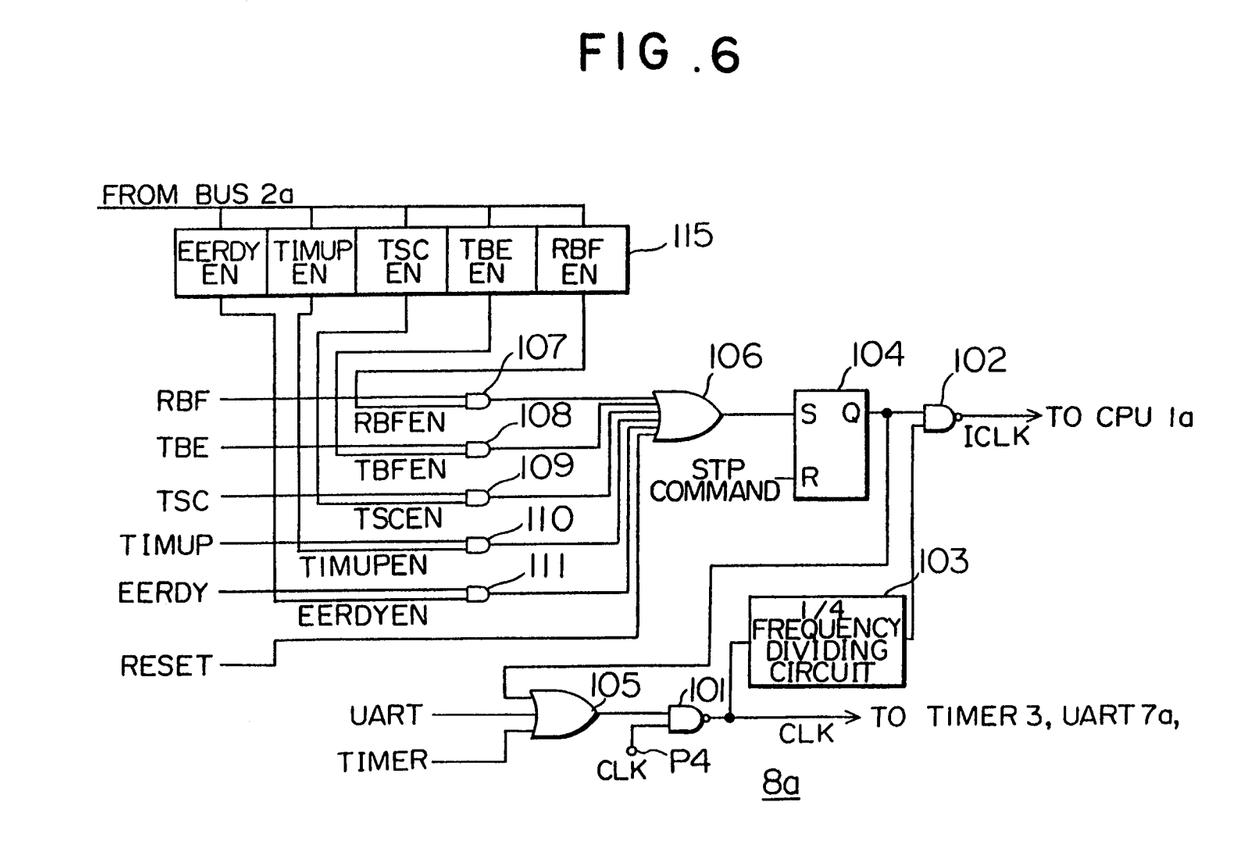
FIG. 6 is a circuit diagram of a clock control circuit in FIG. 5.

FIG. 5 is a block diagram showing the internal configuration of an IC card 100b according to another embodiment of the present invention. The IC card 100b FIG. 5 is different from the IC card 100a of FIG. 1 in that an EEPROM 5b has a clock generator 50 built therein. Accordingly, it is not required for the EEPROM 5b to generate an operation signal (EEPROM signal) for requesting the external clock signal. Corresponding to the above modification, the clock control circuit 8 of FIG. 5 is also modified to a clock control circuit 8a shown in a circuit diagram of FIG. 6. In other words, the determination as to whether input of the external clock signal should be allowed or inhibited is made in accordance with the operation signals (UART signal and TIMER signal) from the UART 7a and the timer 3, as well as the output of the flip-flop 140. The need of supplying the clock signal to the EEPROM 5b is of course eliminated.

Operation of this embodiment is basically similar to the above embodiment and hence a detailed description will not be repeated. In this embodiment, when the CPU 1a, the UART 7a and the timer 3 are all stopped in operation, the output signal of the OR gate 105 in FIG. 6 takes an "L" level so that input of the external clock signal is inhibited and no clock signals are supplied to any circuits. Accordingly, the operation in the case of "3) When writing data into EEPROM" described relating to the operation of the above embodiment, for example, proceeds in this embodiment as follows. After instructing the EEPROM 5b to write data, the CPU 1a stops operation by executing the STP command. Following this stop, input of the external signal is inhibited until the EERDY signal takes an "H" level.

According to the IC card of the present invention, as described above, a clock control circuit is provided which functions in such a manner as to allow input of a clock signal externally of the card even with the CPU being stopped if any of means requiring the external clock signal for operation is under operation, to allow the clock signal to be continuously input even after the CPU has stopped operation if any of means requiring the external clock signal is still under operation, and to inhibit input of the clock signal without intervention of the CPU when all the means are in states of not requiring the clock signal. As a result, there are obtained advantages that the IC card can be automatically brought into a standby state without intervention of any software, programs necessary for operating the CPU can be more easily prepared, and the burden imposed on the CPU can be lessened in terms of processing.

What is claimed is:

1. An IC card comprising:
   data input/output means started in response to detection of a start bit of received data for performing data input/output control of said IC card,
   data processing means for processing data,
   nonvolatile memory means for storing programs to be executed by said data processing means,
   writable nonvolatile memory means for storing data,
   clock control means for controlling input of a clock signal from outside said card,
   timer means for timing a time period of preset duration, and
   system bus means interconnecting said data input/output means, data processing means, nonvolatile memory means, writable nonvolatile memory means, clock control means, and timer means wherein:
   said data input/output means, said writable nonvolatile memory means, and said timer means which require the clock signal for operation generate operation signals indicating their respective operation, the operation signals being supplied to said clock control means, and
   said clock control means includes a switching control section for controlling supply of the clock signal to said data processing means in response to the operation signals generated by said data input/output means, writable nonvolatile memory means, and timer means, and a clock input control section in response to said switching control section and the operation signals so that when at least one of said data input/output means, writable nonvolatile memory means, and timer means are in operation, the clock signal is supplied to said data input/output means, writable nonvolatile memory means, and timer means, and when none of said data input/output means, writable nonvolatile memory means, and timer means are in operation, input of the clock signal is inhibited.

2. The IC card according to claim 1 wherein said writable nonvolatile memory means includes a clock generator while said data input/output means and said timer means both generate operation signals indicating operation and requirement for the clock signal.

3. The IC card according to claim 1 wherein said data input/output means comprises a UART having a shift register for asynchronous transmission and reception of data, and said UART includes an input data detecting circuit for detecting a start bit in data received from outside of said card.

4. The IC card according to claim 1 wherein said data input/output means, said writable nonvolatile memory means, and said timer means all generate respective operation end signals indicating that their respective operations have been completed, and said switching control section of said clock control means includes a select register for storing start-up select conditions set by said data processing means and a temporary storage section for allowing and inhibiting supply of the clock signal necessary for operation of said data processing means in accordance with output signals of said shift register and the operation end signals, said clock input control section operating in accordance with a state of said temporary storage section and states of the operation signals so that when any one of said data input/output means, writable nonvolatile memory means, and timer means are in operation and need the clock signal, the clock signal is input, the supply of the clock signal to said data processing means being controlled by said temporary storage section, and when none of said data input/output means, writable nonvolatile memory means, and timer means are in operation, input of the clock signal is inhibited.

* * * * *